UNITED STATES PATENT OFFICE.

RUSSELL SPAULDING, OF CHICAGO, ILLINOIS, ASSIGNOR TO MARGUERITE SPAULDING, OF NEW YORK, N. Y.

APPARATUS FOR PRODUCING ELECTRICAL DISCHARGES.

1,049,775.   Specification of Letters Patent.   Patented Jan. 7, 1913.

Application filed April 28, 1910, Serial No. 558,253. Renewed September 19, 1912. Serial No. 721,325.

*To all whom it may concern:*

Be it known that I, RUSSELL SPAULDING, a citizen of the United States, residing at Chicago, in the county of Cook and State of Illinois, have invented a certain new and useful Improvement in Apparatus for Producing Electrical Discharges, of which the following is a full, clear, concise, and exact description, reference being had to the accompanying drawings, forming a part of this specification.

My invention relates to apparatus for establishing electrical discharges between spaced apart electrodes and has a number of objects and advantages in view.

In accordance with one feature of my invention, I place an electrode that is connected with one side of a source of charging current in such association with a plurality of physically separated electrodes connected with the other side of the source of charging current as to bring about discharges in different directions between the first electrode and its companion electrodes.
In the preferred embodiment of the present feature of my invention, the directions of discharge are angularly related and a plurality of electrodes in parallel relation is connected with each side of the source of charging current.

In accordance with another feature of my invention, the charging current is induced as alternating current in an induced local circuit, the secondary or induced coil in which circuit constituting the source of wave form current that is to be employed in bringing about the desired electrical discharges. The inducing circuit may be supplied with current from any suitable source and the primary or inducing coil that is in transformer relation with the secondary coil is located, together with said secondary coil, in a cabinet or housing that also desirably incloses the electrodes and the means for effecting the passage of fluid, such as air or gas, through the spaces between the electrodes for the purpose of changing the chemical nature of such fluid. The primary or inducing coil may have its circuit supplied from the generator side of a motor-generator whose motor side is driven by direct current, or said primary circuit may be directly included in circuit with a central station alternating current generator, according to the character of current that is available for the operation of my apparatus. Where the apparatus of my invention is employed for ozonizing the oxygen in the air, the motor portion of the motor-generator may operate an air circulating fan or pump to promote the progress of the air through the spaces between the electrodes in the case where direct current is the initial current that is available. Where alternating current is the initial current that is available, a special motor may be supplied to be operated by such current merely for the purpose of effecting the desired circulation of the fluid that is to be subjected to the action of the machine. The closure to the cabinet or housing is arranged to operate switching mechanism for opening the inducing circuit when the housing is open, so that while the housing is open the apparatus included therein may be inspected without danger of high tension shocks to the operator, inspector or adjuster, owing to the fact that the inducing circuit for the high tension circuit is open. While I prefer to include the switching device in the primary circuit for the purpose of rendering the high potential induced circuit idle and therefore harmless, I do not wish to be limited to the inclusion of the switching device in the primary circuit.

The features of my invention above referred to will be more fully described in connection with the accompanying drawing which also discloses other features of my invention that will be set forth.

In the drawing, Figure 1 is a view in vertical sectional elevation of a machine constructed in accordance with my invention for the purpose of ozonizing oxygen, though I do not wish to be limited to this use of my invention; Fig. 2 is a plan view of the structure illustrated in Fig. 1 with the top removed; Fig. 3 is a side elevation, partially broken away, illustrating a part of a set of electrodes as they are separably associated with the balance of the apparatus; Fig. 4 is a diagram illustrating the circuit arrangement of apparatus constructed and arranged in accordance with certain features of my invention, as such apparatus is associated with an initial source of direct current; Fig. 5 is another diagrammatic view illustrating the association of my apparatus with an initial source of alternating current; Fig. 6 is a view in sectional elevation of the diaphragms illustrated in Figs. 1 and 2; and Fig. 7 is a diagrammatic view illustrating the preferred circuit arrangement of the electrodes.

Like parts are indicated by similar characters of reference throughout the different figures.

The housing or cabinet $a$ may be of any suitable construction and may have any suitable closure $b$ permitting and preventing access thereto, this closure being associated with the balance of the housing by any suitable means, such for example as the pins $c$ that may be removably inserted within sockets $d$ in the body portion of the housing. Inasmuch as my invention is shown in the drawing as being embodied in an apparatus for ozonizing oxygen or air, I have provided means for promoting the draft of the oxygen or air to be ozonized through the housing, and this means is shown as including a motor driven air pump or fan $e$ located in register with an opening $f$ in a partition $g$ that divides the housing into two compartments, in one of which the electrodes $h$ are desirably exclusively contained and in the other of which the balance of the apparatus is contained, excepting the initial source of current $i$ or $k$ and the hand switch $l$ and plug $o$ for effecting the inclusion thereof in the circuit and the exclusion thereof from the circuit of the motor $m$ and the conductors that enable the primary or inducing coil $n$ to be impressed with wave form current.

Referring now to the system illustrated in Fig. 4, I have there shown a main generator $i$ that produces direct current which may be included in circuit with the motor $m$ by means of the plug switch $o$ and a hand switch $l$. The motor $m$ operates a wave form current generator $o'$ that desirably produces alternating current and which is included in closed circuit with the primary winding $n$ when the housing closure $b$ is in place, the housing closure carrying one element $p$ of a switch that connects complemental contacts $q$ carried upon the body of the housing when said closure is in position, the switch elements $p$ $q$ then being in serial relation with the primary winding $n$, whereby, when the closure $b$ is removed, an infinite or sufficiently high resistance is introduced in the primary circuit to effect a discontinuation of current of high potential upon the secondary circuit that includes the electrodes $h$ and the induced or secondary coil $r$ that constitutes the preferred source of wave form current for charging the said electrodes. Fuses $s$ are included in the conductors between the motor $m$ and the generator $i$, these fuses being suited to the load imposed upon the circuit by the motor $m$ and, through said motor, by the inducing primary coil $n$ and the secondary circuit including the secondary coil $r$ and the electrodes $h$. Lighter fuses $t$ are included in the primary circuit of Fig. 4 that are suited to the load that is due only to the generator $o'$ and the current it impresses upon the coil $n$ and which is transformed in the secondary circuit.

In the arrangement shown in Fig. 5, the motor $m$ does not have two functions, namely a generator driving function in addition to the fan driving function, but has only the fan driving function, said motor thus being in bridge of the primary circuit, which primary circuit is shown as also including the source of wave form current $k$. In the arrangement of Fig. 5, fuses $s$ and $t$ are employed which are comparatively heavy and light respectively, the fuses $s$ being adapted to the load due to the inducing and induced coils $n$ and $r$ and the mechanically loaded motor $m$, while the lighter fuses $t$ are suited to the load that is alone due to the coils $n$ and $r$ and their associate parts.

One arrangement of electrodes $h$ is illustrated in Fig. 4 and a simplified arrangement is illustrated in Fig. 5, but neither of these arrangements is the preferred arrangement, the preferred arrangement being structurally illustrated in Figs. 1, 2 and 3, and diagrammatically in Fig. 7. In Fig. 4, a rotatable bus bar $u$ is illustrated for governing the number of electrodes $h$ and the electrodes complemental thereto that are actively to be included in the secondary circuit.

Referring now to the preferred arrangement of the electrodes illustrated in Figs. 1, 2, 3 and 7, I have disposed the electrodes connected with one terminal of the secondary coil $r$ in one group and the electrodes connected with the complemental terminal of said secondary coil in another group, the electrodes of each group being physically separated and so related with the electrodes of the complemental group as to enable the discharges from each electrode to complemental electrodes to leave such electrode in different directions which are desirably angular. I have provided an apparatus for producing electrical discharges including a source of wave form current; two groups of spaced apart electrodes, the electrodes of one group being of one polarity and the electrodes of the other group being of the opposite polarity, the electrodes of each group being distributed in a plurality of rows with electrodes of the other group in a manner to enable the occurrence of discharges between each individual electrode of each group and a plurality of electrodes of the other group. The spaces intervening between adjacent electrodes lying in horizontal planes are equal to the spaces between the adjacent electrodes lying in vertical planes so that the air resistances between complemental electrodes are substantially uniform, whereby discharges may occur from each of the electrodes in horizontal directions. One group of electrodes is provided with an adjustable bus bar $u$ for governing the number of electrodes included in such group that are to be charged with current, it being obvious that electrodes complemental to the electrodes rendered inert by the adjustable bus bar are also inert with respect to the inert electrodes of the group provided with the adjustable bus bar. The compartment of the housing that contains the electrodes is desirably provided with means for separably associating a plurality of groups of electrodes $h$ and, as described, with the secondary circuit, but one of such groups being indicated, provision for enabling the connection of another group being shown. Each set of electrodes $h$ is provided with a pair of terminals $v$ (Fig. 3) that are receivable in sockets containing contact springs $w$ that constitute terminals of the secondary coil $r$. I have thus provided an apparatus for producing electrical discharges including a plurality of mechanically united electrodes, a support therefor and with respect to which said mechanically united electrodes are separable, and switching mechanism for including the electrodes in circuit and for excluding the electrodes from circuit when the electrodes are removed, one member of the switching mechanism being mechanically united with the electrodes and a complemental member of said switching mechanism being carried by the support, and which latter member is connected with the supply circuit whereby the electrodes are automatically included in circuit when they are placed upon their support and are excluded from circuit when they are removed from their support. By providing the means for effecting discharges between each of the electrodes and complemental electrodes in different directions, a suitable action is occasioned upon the fluid passing between the electrodes, which, however, is not excessive and which may be amplified by duplicating or multiplying the number of groups of electrodes $h$. In the case of ozonized air or oxygen, I desirably employ a chute $x$ that will cause the upward deflection of the ozone so that it will reach the upper portions of the air that is to be supplied with the ozone and have an opportunity to spread and mix with the air before the air treated with the ozone is used, a mechanical guard $y$, desirably of coarse meshed screen, being included in the housing opening through which the ozonized oxygen emerges, the guard $y$ being merely a protection device to prevent meddlers from interfering with the interior of the apparatus. The partition $g$ is so disposed with respect to the fan $e$ as to prevent the return of the air that has once passed through the partition. The arrangement is such that the air flows at right angles to some discharges and angularly to all discharges so that the air is compelled to pass through all discharges. The extent to which the air is ozonized may be regulated by the adjustable bus bar $u$ as has hitherto been proposed in the art, but the degree of concentration cannot be regulated by the adjustable bus bar, and as it is desirable to vary the degree of concentration, I have provided means whereby this result may be accomplished, this means including a valving arrangement whereby the volume of admitted air may be regulated at will. This valving means, in the embodiment of the invention illustrated, includes a plurality of independently insertible and removable diaphragms $z$ having openings differing in size. Three such diaphragms are illustrated and if the minimum quantity of air is to be admitted, the three diaphragms are desirably located as illustrated, the diaphragms with larger openings remaining in place merely for the sake of convenience; if a larger flow of air is required, the diaphragm with the smallest opening and nearest the outside of the housing is removed; and if a still larger volume of air is required, the diaphragm next to the outermost diaphragm is removed, leaving the innermost diaphragm that has the largest opening.

It is very obvious that many other devices may be employed to regulate the volume of the air, though I prefer the partitions $z$ inasmuch as each may be constructed in hinged halves whose openings are provided with fine meshed screens $z'$ and between which halves a layer of felt or other air straining material $z^2$ may be interposed.

The motor structure $m$ is provided with a hollow base, under which or within which the transformer coils $n$ and $r$ may be disposed.

While I have shown the preferred arrangement of the switch elements $p$ $q$ and details of construction that I desire in what I consider to be the best practice of my invention, yet I do not wish to be limited to the precise details of construction and circuit arrangement shown, as changes may readily be made without departing from the spirit of the invention.

Having thus described my invention, I claim as new and desire to secure by Letters Patent the following:—

1. An apparatus for producing electrical discharges, including primary and secondary circuits containing inducing and induced coils respectively; electrodes included in the secondary circuit; a housing inclosing said electrodes and the said inducing and induced coils, said housing having a movable closure movable independently of said electrodes and coils; and a switching device for opening and closing the primary circuit governed by the closure.

2. An apparatus for producing electrical discharges, including primary and secondary circuits containing inducing and induced coils respectively; electrodes included in the secondary circuit; a housing inclosing said electrodes and the said inducing and induced coils, said housing having a movable closure movable independently of said electrodes and coils; and a switching device for rendering effective and ineffective the secondary circuit and governed by the closure.

3. An apparatus for producing electrical discharges, including spaced apart electrodes between which the discharges are to occur; a source of wave form current for charging said electrodes; means for effecting the flow of air past said electrodes; and a plurality of screens located in the path of the air as it flows to the electrodes, said screens being in separable relation whereby the number thereof may be varied for the purpose of varying the volume of air which is passed between the electrodes where the electrical discharges occur.

4. An apparatus for producing electrical discharges including a plurality of mechanically united electrodes; a support therefor and with respect to which said mechanically united electrodes are separable; and switching mechanism for including the electrodes in circuit and for excluding the electrodes from circuit when the electrodes are removed, one member of the switching mechanism being provided upon the electrodes and a complemental member of said switching mechanism provided upon the support and which latter member is connected with the supply circuit, whereby the electrodes are automatically included in circuit when they are placed upon their support and are excluded from circuit when they are removed from their support.

5. An apparatus for producing electrical discharges including a source of wave form current; two groups of spaced apart electrodes, the electrodes of one group being of one polarity and the electrodes of the other group being of the opposite polarity, the electrodes of each group being distributed in a plurality of rows with electrodes of the other group with each electrode of each group in discharging distance from a plurality of electrodes of the other group; and means whereby the air is caused to flow angularly with respect to the direction of discharges occurring between the electrodes of the two groups.

In witness whereof, I hereunto subscribe my name this 25th day of April, A. D., 1910.

RUSSELL SPAULDING.

Witnesses:
G. L. CRAGG,
R. E. ATHERTON.